(12) United States Patent
Ronald et al.

(10) Patent No.: US 8,961,081 B2
(45) Date of Patent: Feb. 24, 2015

(54) APPARATUS FOR CHAMFERING AND/OR DEBURRING OF GEARS

(75) Inventors: Craig R. Ronald, Fairport, NY (US); Alan S. Metelsky, Rochester, NY (US)

(73) Assignee: The Gleason Works, Rochester, NY (US)

( * ) Notice: Subject to any disclaimer, the term of this patent is extended or adjusted under 35 U.S.C. 154(b) by 323 days.

(21) Appl. No.: 13/392,600

(22) PCT Filed: Sep. 24, 2010

(86) PCT No.: PCT/US2010/050157
§ 371 (c)(1),
(2), (4) Date: Feb. 27, 2012

(87) PCT Pub. No.: WO2011/038201
PCT Pub. Date: Mar. 31, 2011

(65) Prior Publication Data
US 2012/0155980 A1 Jun. 21, 2012

Related U.S. Application Data

(60) Provisional application No. 61/245,765, filed on Sep. 25, 2009.

(51) Int. Cl.
*B23F 19/10* (2006.01)
*B23Q 1/62* (2006.01)
(Continued)

(52) U.S. Cl.
CPC .............. *B23Q 1/623* (2013.01); *B23F 17/006* (2013.01); *B23F 19/10* (2013.01); *B23Q 1/488* (2013.01); *B23Q 1/625* (2013.01)

USPC ................ 409/8; 409/61; 409/166; 409/167; 409/235; 409/38; 29/27 R; 82/124

(58) Field of Classification Search
CPC ...................................................... B23F 19/10
USPC ......... 409/8, 38, 39, 165–167, 160, 191, 235, 409/25, 27, 28, 50, 61, 201, 211, 216; 82/124, 125; 29/27 R, 27 C
See application file for complete search history.

(56) References Cited

U.S. PATENT DOCUMENTS 2,772,602 A * 12/1956 Christman ........................ 409/8
3,083,616 A    4/1963 Male
(Continued)

FOREIGN PATENT DOCUMENTS

DE           10019669 A1   10/2001

OTHER PUBLICATIONS

International Search Report and Written Opinion for PCT/US2010/050157.

*Primary Examiner* — Daniel Howell
*Assistant Examiner* — Ryan Rufo
(74) *Attorney, Agent, or Firm* — Robert L. McDowell

(57) ABSTRACT

Gear processing machine (4), such as a gear cutting or grinding machine, wherein a chamfering and/or deburring apparatus (2) and auxiliary spindle (10) are included on the same machine. A transfer mechanism (8) loads, unloads and transfers workpieces between a machining spindle (6) and the auxiliary spindle (10) thereby enabling simultaneous cutting and chamfering and/or deburring processes to be carried out. Via the auxiliary spindle, completed workpieces may be removed from the machine and blank workpieces may be loaded into the machine while another gear is being processed on the machine spindle thereby enhancing machine output and creating a more efficient operation.

14 Claims, 4 Drawing Sheets

(51) Int. Cl.
  *B23F 17/00* (2006.01)
  *B23Q 1/48* (2006.01)

(56) References Cited

U.S. PATENT DOCUMENTS

| | | | |
|---|---|---|---|
| 3,971,293 A * | 7/1976 | Hunkeler | 409/5 |
| 4,316,398 A * | 2/1982 | Link et al. | 82/125 |
| 4,510,668 A * | 4/1985 | Ishida et al. | 29/561 |
| 4,760,672 A * | 8/1988 | Darcangelo et al. | 451/42 |
| 4,930,950 A * | 6/1990 | Stadtfeld | 409/27 |
| 5,058,261 A * | 10/1991 | Kitamura | 483/18 |
| 5,765,270 A * | 6/1998 | Schrod et al. | 29/27 R |
| 6,390,894 B1 * | 5/2002 | Beel et al. | 451/47 |
| 6,840,720 B2 * | 1/2005 | Mall | 409/8 |
| 7,137,940 B2 * | 11/2006 | Taniguchi et al. | 483/56 |
| 7,150,213 B2 * | 12/2006 | Bautz | 82/122 |
| 8,074,543 B2 * | 12/2011 | Hyatt et al. | 82/121 |
| 8,647,033 B2 * | 2/2014 | Moser et al. | 409/11 |
| 2003/0177623 A1 * | 9/2003 | Geissler et al. | 29/27 C |
| 2004/0107556 A1 * | 6/2004 | Yasuda et al. | 29/27 C |
| 2005/0207858 A1 * | 9/2005 | Muller et al. | 409/8 |
| 2006/0002775 A1 * | 1/2006 | Fong et al. | 409/27 |
| 2007/0020058 A1 | 1/2007 | Peiffer et al. | |
| 2007/0044290 A1 * | 3/2007 | Grossmann | 29/36 |
| 2007/0234541 A1 * | 10/2007 | Feinauer et al. | 29/27 C |
| 2008/0131224 A1 * | 6/2008 | Vouillamoz | 409/74 |
| 2009/0097934 A1 * | 4/2009 | Hsiao et al. | 409/26 |
| 2009/0136312 A1 * | 5/2009 | Grossmann | 409/201 |

* cited by examiner

APPARATUS FOR CHAMFERING AND/OR DEBURRING OF GEARS

FIELD OF THE INVENTION

The disclosed invention relates to the manufacture of gears and other toothed articles. In particular, the invention is directed to the chamfering and/or deburring of gears, especially bevel gears.

BACKGROUND OF THE INVENTION

In the cutting of gears and other toothed articles, such as bevel gears and in particular spiral bevel and hypoid gears, it is common to produce a burr at the end of a tooth where the cutting tool exits the tooth slot. Burrs are particularly noted at the end of concave tooth flanks on spiral bevel ring gears and pinions. Regardless of location on a gear, burrs pose a safety and performance hazard and therefore must be removed.

It may also be desirable to provide a chamfer at one or both ends of gear teeth including tip and root ends. After cutting, sharp corners usually exist at the intersection of the tooth sides, tip and/or root with the front and/or back faces and removing the sharp corners makes handling the gear safer and eliminates a potential area of unacceptably high hardness after heat treating.

Chamfering may be carried out at various times and locations with respect to the actual cutting process. Separate chamfering machines are known in the art. Chamfering and/or deburring of a gear with a rotary tool while the gear remains positioned on the work spindle of a cutting machine is known, for example, from U.S. Pat. No. 7,431,544 or U.S. Patent Application Publication No. 2007/0020058. However, chamfering in this manner slows production of the particular machine since cutting of a subsequent workpiece must wait until after the gear is chamfered and/or deburred.

From U.S. Pat. No. 3,083,616 it is disclosed to provide a chamfering mechanism adjacent a workpiece spindle in a gear cutting machine whereby chamfering takes place simultaneously with gear cutting. A rod-shaped deburring tool advances from a retracted position to chamfer the edge of a newly-cut tooth as the gear is indexed to the next tooth slot position for cutting. While such an arrangement may reduce non-cutting time on the machine, there is little flexibility with such a system with respect to modifying the size, extent or shape of the chamfer. Furthermore, the disclosed chamfering mechanism is not capable of chamfering gears produced by continuous indexing processes (i.e. face hobbing).

SUMMARY OF THE INVENTION

The present invention is directed to a gear processing machine, such as a gear cutting or grinding machine, wherein a chamfering and/or deburring apparatus and auxiliary spindle are included on the same machine. A transfer mechanism loads, unloads and transfers workpieces between a machining spindle and the auxiliary spindle thereby enabling simultaneous cutting and chamfering and/or deburring processes to be carried out. Via the auxiliary spindle, completed workpieces may be removed from the machine and blank workpieces may be loaded into the machine while another gear is being processed on the machine spindle thereby enhancing machine output and creating a more efficient operation.

DETAILED DESCRIPTION OF THE PREFERRED EMBODIMENT

Figure 1:
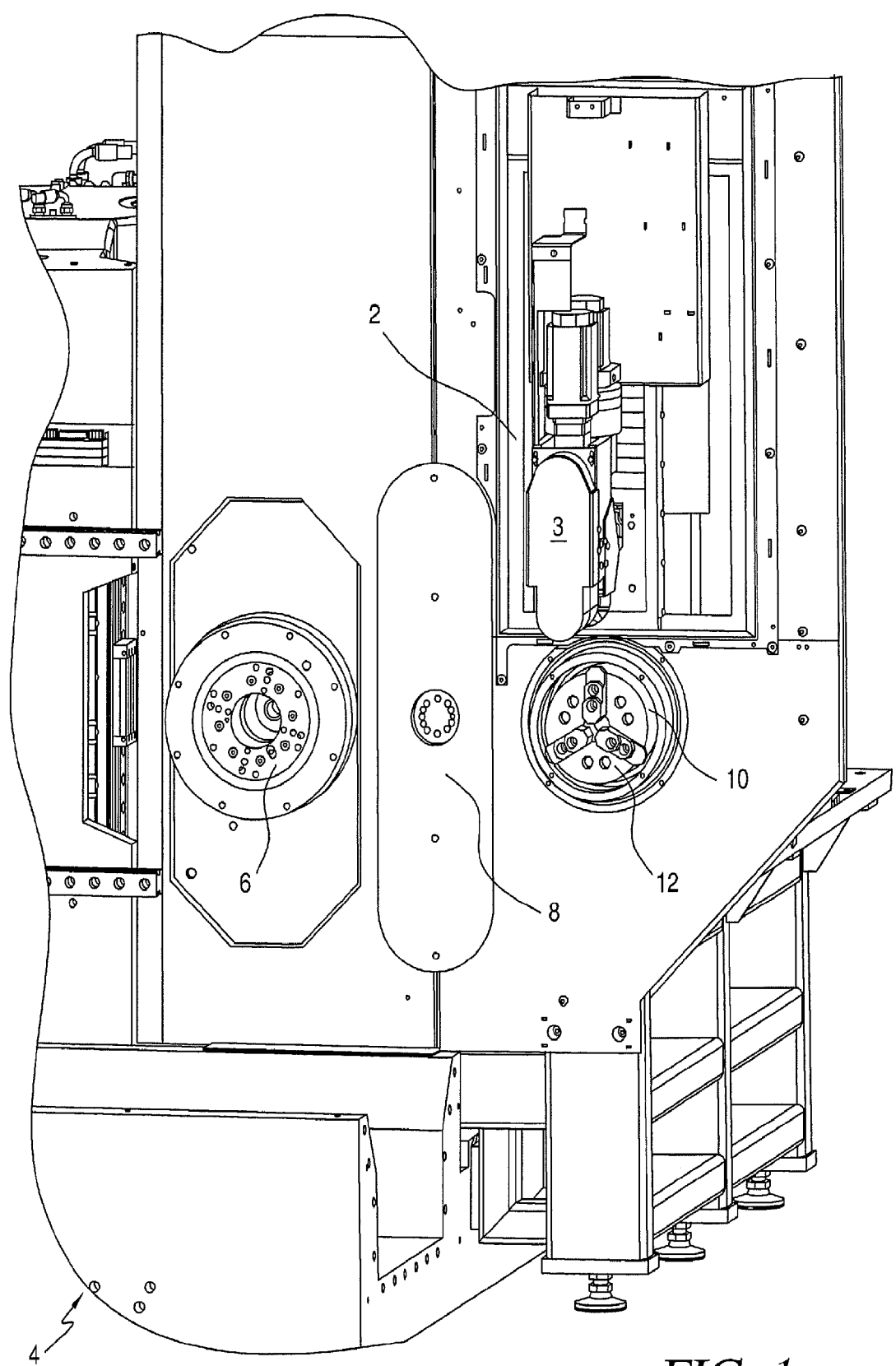
FIG. 1 is a partial front view of a gear processing machine showing a work spindle and the inventive chamfering and/or deburring apparatus with auxiliary spindle.

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply an order of importance or significance.

In the context of the present invention, the term "bevel" gears is understood to be of sufficient scope to include those types of gears known as bevel gears, "hypoid" gears, spiral bevel and hypoid gears, as well as those gears known as "crown" or "face" gears.

The inventive chamfering and deburring apparatus 2 is shown in FIG. 1. The apparatus 2 is preferably included as an element of a gear processing machine 4, preferably a gear cutting or grinding machine of the type as disclosed in U.S. Pat. Nos. 6,669,415 and 6,712,566, the disclosures of which are hereby incorporated by reference. For the sake of clarity and ease of viewing, outside sheet metal and some guarding has been omitted. The chamfering and deburring apparatus 2 is preferably positioned near to a workpiece spindle 6 of the gear cutting or grinding machine 4 (discussed hereafter with reference to a gear cutting machine). A pivoting transfer arm 8 transfers workpieces between the workpiece spindle 6 and an auxiliary spindle 10 which forms a part of the chamfering and deburring apparatus 2 although auxiliary spindle 10 may also have utilities apart from chamfering and deburring as will be discussed further below. A three-jaw chuck 12 for holding a workpiece is shown on spindle 10 but other suitable workholding equipment may be utilized as can be appreciated by the skilled artisan. Workpiece spindle 6 is shown without workholding equipment. However, the skilled artisan will understand that appropriate workholding equipment will be utilized depending upon the geometry of the workpiece being machined.

Figure 2:
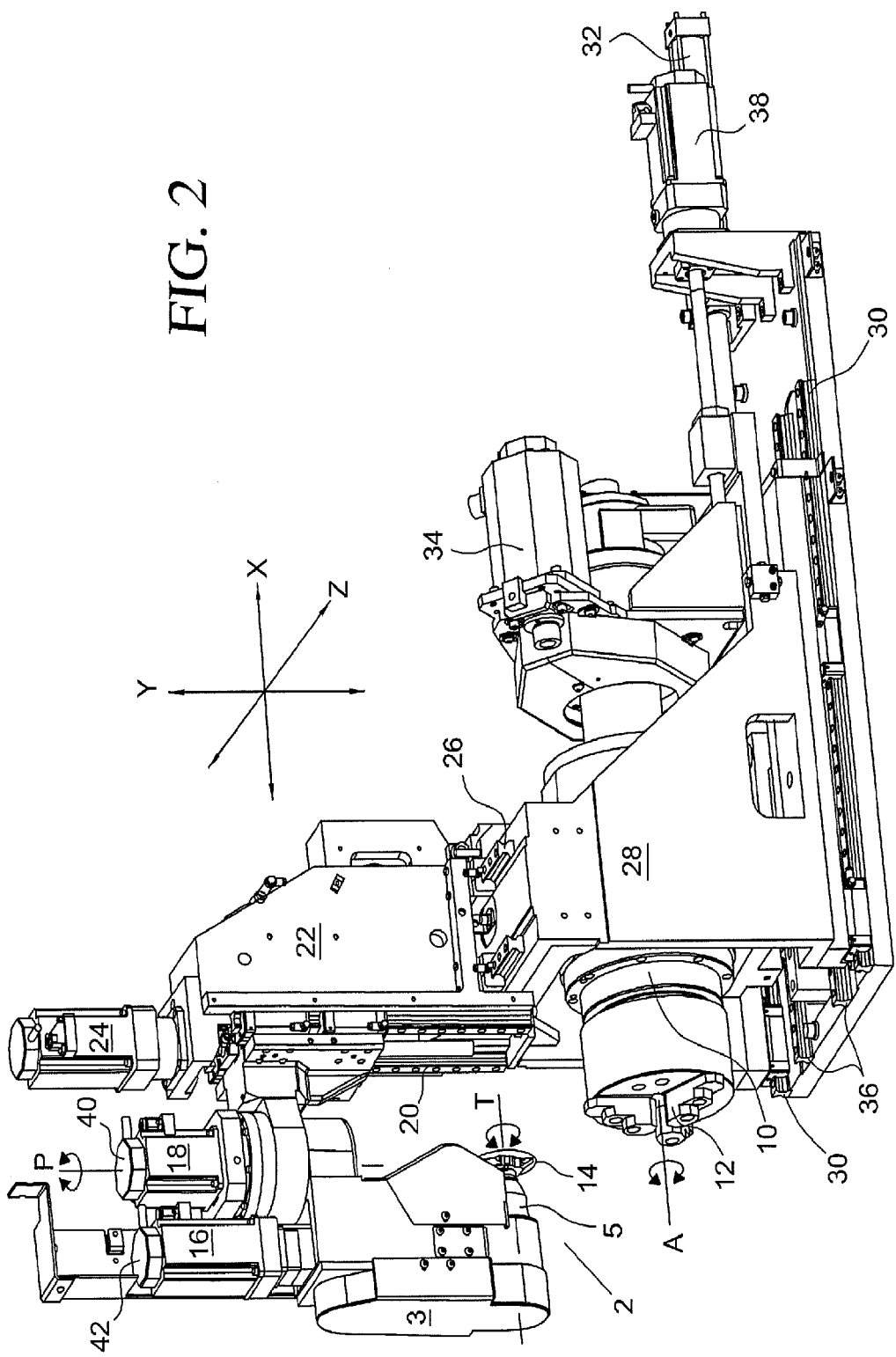
FIG. 2 is a side view of the inventive chamfering and/or deburring apparatus and auxiliary spindle.
Figure 3:
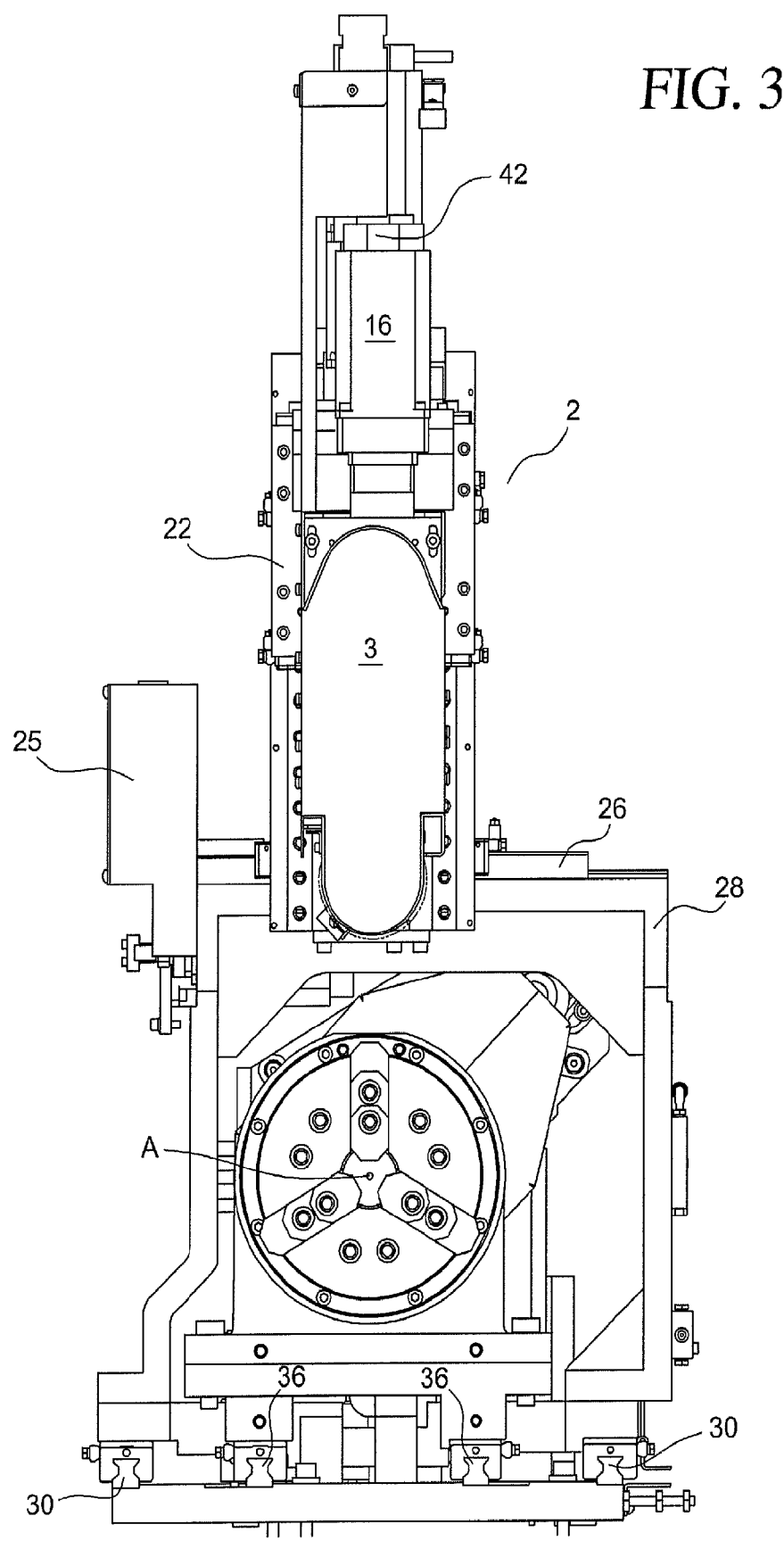
FIG. 3 is a front view of the inventive chamfering and/or deburring apparatus and auxiliary spindle.

FIG. 2 illustrates a preferred arrangement for the chamfering and deburring apparatus 2 and the auxiliary spindle 10. The apparatus 2 comprises a tool head 3, tool spindle 5 and tool 14, such as a chamfering and deburring tool, which is rotatable about a tool axis T. Tool 14 is driven for rotation by a servo motor 16. Tool head 3 is pivotable about a pivot axis P driven by servo motor 18. Tool head 3 is movable in a first linear direction, Y, along rails 20 mounted to a column 22 with the linear motion being driven by servo motor 24. Column 22, and hence tool head 3, is movable in a second linear direction, Z, via a servo motor 25 (FIG. 3). Column 22 is movable on rails 26 mounted to frame 28. Frame 28 is movable in a third linear direction, X, on rails 30 via hydraulic piston 32 although other types of movers, such as a servo motor, may be utilized. Preferably, hydraulic piston 32 moves frame 28 between an advanced position toward the tool head 3 (shown) and a retracted position away from the tool head 3 although additional defined stops or coordinated movement with other machine motions are also contemplated. A servo motor may be used for moving frame 28 instead of hydraulic piston 32.

Auxiliary spindle 10 is driven for rotation about axis A by a servo motor 34. Auxiliary spindle 10 is also linearly movable in direction X on rails 36 via servo motor 38. Alternatively, auxiliary spindle 10 may be direct driven. Preferably, directions X, Y and Z are mutually perpendicular with respect to one another although one or more may be inclined with respect to its perpendicular orientation. For purposes of illustration, in all Figures, the Y direction is vertical.

Movement of the tool head 3 in direction Y, column 22 in direction Z, auxiliary spindle in direction X, pivoting of tool head 3 about axis P, as well as tool 14 rotation about axis T and auxiliary spindle 10 rotation about axis A, is imparted by the separate drive motors 24, 25, 38, 18, 16 and 34 respectively. The above-named components are capable of independent movement with respect to one another or may move simultaneously with one another. Each of the respective motors is preferably associated a feedback device such as a linear or rotary encoder, such as pivot axis encoder 40 or Y direction encoder 42 (FIG. 2), as part of a computer numerically controlled (CNC) system which governs the operation of the drive motors in accordance with instructions input to a computer controller (i.e. CNC) such as a Fanuc model 30i (not shown).

With respect to loading a workpiece from outside of the machine 4 into auxiliary spindle 10, such as a blank workpiece to be cut, or with respect to unloading a workpiece from machine 4 by removing a machined workpiece from auxiliary spindle 10, such as a deburred and/or chamfered workpiece, the loading and unloading may be carried out manually or via an automated mechanism (e.g. gantry or robotic loading/unloading mechanism).

An operation for chamfering and/or deburring will be described from an exemplary beginning reference point of a blank workpiece (e.g. pinion with shank) being positioned on spindle 6 and a cut workpiece of the same type (e.g. pinion with shank) being positioned on auxiliary spindle 10. Cutting commences on the blank workpiece on spindle 6 and chamfering commences on the workpiece on auxiliary spindle 10. The chamfering and deburring tool 14 is moved along a path relative to the workpiece by a combination of one or more motions in the previously described linear and/or rotary directions X, Y, Z, P, T and A whereby the desired chamfered surface is produced on the teeth of the workpiece at the ends of the teeth (e.g. on one or both sides, top and/or root) at the front face and/or back face of the gear. Additionally, chamfering along all or part of the lengthwise direction of the tooth tip may also be carried out.

Once chamfering is completed, the workpiece is unloaded from auxiliary spindle 10 and removed from the machine 4 in a manner as discussed above. Another workpiece blank is then loaded into auxiliary spindle 10. Since the gear chamfering process is usually of a shorter duration than cutting a gear blank, there is sufficient time remaining after chamfering to unload the completed gear and subsequently load a gear blank into auxiliary spindle 10 during which cutting of the gear blank is still being carried out on spindle 6. For example, a cutting time of 1 minute and 50 seconds is needed for a spiral bevel pinion having 11 teeth while only about 1 minute is needed for chamfering. Therefore, it can be seen that about 50 seconds remains in which one or more additional procedures may be carried out and/or the completed gear can be unloaded from auxiliary spindle 10 and a gear blank can then be loaded on to the auxiliary spindle.

Figure 4:
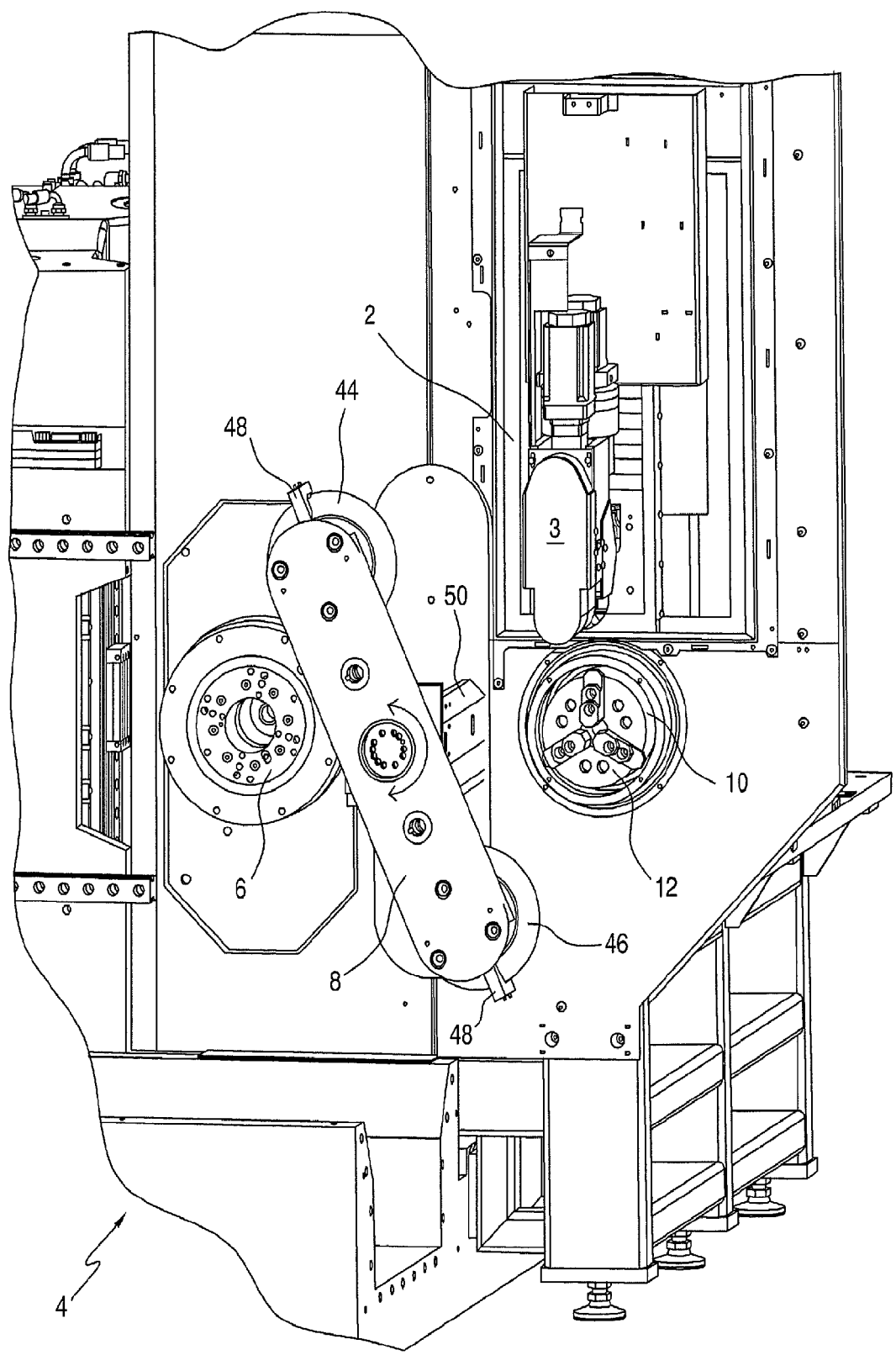
FIG. 4 is a partial front view of a gear processing machine showing a work spindle, the inventive chamfering and/or deburring apparatus with auxiliary spindle and a transfer arm in a working position.

Thus, upon the completion of cutting, the transfer arm 8 is actuated outwardly (i.e. away from the spindles 6, 10) from its rest position (FIG. 4) and rotated to simultaneously grip a cut gear 44 on spindle 6 and a gear blank 46 on auxiliary spindle 10 via grippers 48 (two or more at each end of transfer arm 8), withdraw both workpieces from their respective spindles and then rotate (about 180 degrees in the preferred embodiment) to bring the blank gear 46 to the work spindle 6 for cutting and the cut gear 44 to auxiliary spindle 10 for chamfering. Inward movement of the transfer arm 8 (i.e. toward the respective spindles) is then effected in order to load the gear blank 46 and cut gear 44 in their respective spindles. Once the workpieces are loaded, the transfer arm 8 returns to its rest position as shown in FIG. 1.

A partition or divider (not shown), such as an accordion-style door, may be included between the spindle 6 and the auxiliary spindle 10 for preventing the influx of metal chips, grinding swarf, processing fluids, etc. into the area around auxiliary spindle 10 during those times when machining operations are being performed on spindle 6. The operation of the partition or divider may be coordinated with the operation of transfer arm 8 such that when transfer arm 8 is in its retracted position (FIG. 1), the partition or divider is extended to form separate chambers, one chamber containing spindle 6 and the other chamber containing auxiliary spindle 10. Upon axial movement of transfer arm 8 out of its retracted position to an operating position, the partition or divider is retracted thereby allowing the transfer of workpieces between spindle 6 and auxiliary spindle 10.

Transfer arm 8 is preferably driven by two servo motors. First servo motor 50 controls the linear outward and inward movements as well as the extent of the linear movement which is dependent upon, among other things, the geometry of the workpiece since it can be understood that greater linear travel is necessary to provide adequate clearance for longer workpieces, such as bevel pinions with shafts, than for gears without shafts such as, for example, most designs of bevel ring gears. The other servo motor (not shown) controls the rotation of transfer arm 8 in order to exchange the workpieces between spindles 6, 10 and bring them into the proper alignment with respect to the spindles 6, 10. While servo drives are preferred, the movements of transfer arm 8 may be effected by other linear and rotational driving means such as hydraulic or pneumatic means.

In loading cut bevel pinions with shafts into auxiliary spindle 10 for chamfering, it may be desirable to axially retract auxiliary spindle 10 be a predetermined amount prior to or during loading in order to create an amount of clearance (i.e. a gap) between the back face of the pinion and the front of chuck 12 to allow the chamfering tool 14 access to the back face of the pinion for chamfering the ends of the teeth at their intersection with the back face of the pinion. By retracting auxiliary spindle 10 a predetermined controlled amount (via servo motor 32), the shank of a cut pinion will not be fully inserted into chuck 12 and a gap of a predetermined dimension will be created for chamfering. Upon removal of the chamfered gear from chuck 12, a pinion blank is then loaded and the shaft of the pinion may be completely inserted into chuck 12 which may then be axially advanced to a position parallel with the pinion being cut on spindle 6 whereby they both may be gripped simultaneously by the transfer arm 8 subsequent to the completion of cutting.

As previously mentioned, in addition to chamfering and/or deburring, or as an alternative thereto, other processes may be carried out on a workpiece positioned in auxiliary spindle 10. For example, if machine 4 is a gear grinding machine and grinding of previously cut gears is being carried out on spindle 6, auxiliary spindle 10 may be utilized as a spin station for removing grinding fluids from a workpiece. Also, measuring of gears may also be performed while a workpiece is positioned on auxiliary spindle 10. Any noted deviations from a desired tooth surface geometry may be utilized for making process corrections in the cutting or grinding process being performed on machine 4 in an effort to reduce or eliminate such deviations on successive workpieces. Additionally, a fixed deburring tool may be attached to and extend from tool head 3 or tool spindle 5.

Alternatively, auxiliary spindle 10 may be utilized for stock division of cut gears prior to grinding. Stock dividing is the proper positioning of a partially finished (e.g. cut) gear relative to a tool (e.g. grinding wheel) prior to the initiation of a finishing cycle (e.g. grinding). Once the proper positioning for grinding of cut workpiece is known with respect to a probe or other device relative to auxiliary spindle 10, that same relative positioning can be repeated for the workpiece positioned on work spindle 6 with respect to a grinding wheel.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for processing a workpiece, said apparatus comprising:
    a frame movable in a first direction;
    a workpiece spindle for rotation of a workpiece about a workpiece axis, said workpiece spindle being located within said frame and being movable in said first direction;
    a column located on said frame and being movable in a second direction perpendicular to said first direction;
    a tool spindle for rotation of a tool about a tool axis, said tool spindle being attached to said column and being movable in a third direction perpendicular to said first and said second directions, said tool spindle being pivotable about a pivot axis extending in said third direction,
    said apparatus being positioned proximate a second workpiece spindle and further including a means to transfer one or more workpieces between said workpiece spindle and said second workpiece spindle thereby enabling simultaneous processing of workpieces on said workpiece spindle and on said second workpiece spindle.

2. The apparatus of claim 1 wherein said first direction is horizontal.

3. The apparatus of claim 2 wherein said second direction is horizontal.

4. The apparatus of claim 1 wherein a first end of said frame is attached to rails for movement of said frame in said first direction and said column is movable on a second end of said frame opposite to said first end.

5. The apparatus of claim 1 further including a chamfering and/or deburring tool positioned on said tool spindle.

6. The apparatus of claim 1 further including a probe positioned on said tool spindle.

7. The apparatus of claim 1 wherein said workpiece axis extends parallel to said first direction.

8. The apparatus of claim 1 wherein said tool axis extends perpendicular to said third direction.

9. The apparatus of claim 1 wherein said means to transfer comprises a pivotable transfer arm.

10. A method for processing a workpiece on an apparatus, said method comprising:
    loading a workpiece on a workpiece spindle for rotation about a workpiece axis, said workpiece spindle being located within a frame of said apparatus with said workpiece spindle and said frame each being movable in a first direction;
    providing a tool positioned on a tool spindle for rotation about a tool axis, said tool spindle being attached to a column with said column being located on said frame and being movable in a second direction perpendicular to said first direction, said tool spindle being movable in a third direction perpendicular to said first and said second directions, said tool spindle being pivotable about a pivot axis extending in said third direction,
    rotating said tool and bringing said tool and said workpiece into engagement,
    moving said tool relative to said workpiece along at least one of said first, second third and pivot directions to process said workpiece in a predetermined manner,
    wherein said loading comprises transferring a workpiece from a second workpiece spindle located proximate said workpiece spindle to said workpiece spindle via a transfer device and loading said workpiece on to said workpiece spindle for processing by a first process.

11. The method of claim 10 wherein said tool is a chamfering tool or a deburring tool.

12. The method of claim 10 wherein said workpiece is a gear.

13. The method of claim 10 further including simultaneously transferring another workpiece from said workpiece spindle to said second workpiece spindle via said transfer device and loading said another workpiece on to said second workpiece spindle for processing by a second process.

14. The method of claim 13 comprising:
    cutting a gear on said second workpiece spindle;
    transferring the cut gear to said workpiece spindle while simultaneously transferring a gear blank to said second workpiece spindle via the same said transfer device;
    cutting said gear blank on said second spindle while simultaneously chamfering and/or deburring said cut gear on said workpiece spindle.

\* \* \* \* \*